United States Patent [19]

Nishikawa

[11] Patent Number: 4,533,228

[45] Date of Patent: Aug. 6, 1985

[54] OPTICAL IMAGE PROJECTOR FOR PROJECTING AN ERECT POSITIVE IMAGE OF UNITY MAGNIFICATION AND FOR MINIMIZING DEGRADATION IN RESOLUTION

[75] Inventor: Masaji Nishikawa, Hachioji, Japan

[73] Assignee: Olympus Optical Company Ltd., Tokyo, Japan

[21] Appl. No.: 494,643

[22] Filed: May 16, 1983

[30] Foreign Application Priority Data

Jun. 15, 1982 [JP] Japan ............... 57-102404

[51] Int. Cl.³ ............... G03B 27/70; G03B 27/00
[52] U.S. Cl. ............... 355/1; 355/3 R
[58] Field of Search ............... 355/1, 3 R

[56] References Cited

U.S. PATENT DOCUMENTS

| | | | |
|---|---|---|---|
| 4,248,517 | 2/1981 | Nishikawa | 355/1 |
| 4,331,380 | 5/1982 | Rees et al. | 355/1 X |
| 4,345,833 | 8/1982 | Siegmund | 355/1 |
| 4,370,055 | 1/1983 | Nishikawa et al. | 355/1 X |
| 4,392,737 | 7/1983 | Nishikawa | 355/3 R |
| 4,408,870 | 10/1983 | Nishikawa et al. | 355/1 X |
| 4,413,903 | 11/1983 | Corona et al. | 355/1 X |
| 4,415,260 | 11/1983 | Kasuga et al. | 355/1 X |
| 4,416,530 | 11/1983 | Hebert et al. | 355/3 R |
| 4,420,245 | 12/1983 | Katao | 355/1 X |
| 4,435,064 | 3/1984 | Tsukada et al. | 355/1 |
| 4,459,010 | 7/1984 | Hinton et al. | 355/1 X |

*Primary Examiner*—A. T. Grimley
*Assistant Examiner*—Terry Flower
*Attorney, Agent, or Firm*—Louis Weinstein

[57] ABSTRACT

An optical image projector includes an array of optical elements which projects an erect positive image of an object onto an image receiving surface which is not parallel to the plane of the object. The array, the plane of the object and the image receiving surface are disposed in a manner such that the angles formed between the plane of the object and the image receiving surface on one hand and the optical axis of the array on the other are equal to each other and are disposed on the same side of the optical axis.

8 Claims, 11 Drawing Figures

OPTICAL IMAGE PROJECTOR FOR PROJECTING AN ERECT POSITIVE IMAGE OF UNITY MAGNIFICATION AND FOR MINIMIZING DEGRADATION IN RESOLUTION

BACKGROUND OF THE INVENTION

The invention relates to an optical image projector, and more particularly, to such projector which utilizes an array of optical focussing elements which projects an erect positive image of unity magnification, for projecting the image of an object onto an image receiving surface which is nonparallel to the plane of the object.

An array of optical focussing elements, as termed a fiber lens array, comprises a plurality of converging light transmitting members, formed of light transmitting material of a rod shape in which the refractive index varies from the center thereof toward the periphery, for projecting an erect positive image of unity magnification. Such array is offered on the marketplace in the tradename of Selfoc lens array (manufactured by Nippon Sheet Glass Co.), and is commonly and extensively in practical use. Such array of optical focussing elements will be referred to hereinafter as a fiber lens array.

In the use of such a fiber lens array, the plane of an object to be projected and an image receiving surface are generally disposed so as to be perpendicular to the optical axis of a lens, in a similar manner to the use of a spherical lens. An essential part of an electrophotographic copying machine which employs an optical image projector of such an arrangement is illustrated in FIG. 1. The plane of an object to be projected is defined by an original receptacle 1 which comprises a glass pane. An original 2 is placed on the receptacle and is illuminated by an illumination unit 3 including a lamp 3a and a reflector 3b. A fiber lens array 4 projects an erect positive image of unity magnification of the original onto a photosensitive drum 5 which constitutes an image receiving surface. Where the fiber lens array 4 is used, the distance Tc between the original surface v and the image receiving surface z is small, normally 80 mm or less, thus leaving little freedom to change its arrangement. For example, when the original surface v is horizontal, it is necessary that the array 4 be disposed so that its optical axis P coincides with a vertical line Q passing through the center O of the drum 5.

While the arrangement shown in FIG. 1 provides an optimum optical performance, if it becomes necessary to transpose the array 4 to another location in consideration of some other member which must be disposed around the drum 5, there is little freedom to allow for this. By way of example, assume that it becomes necessary to dispose the array 4 so that it be disposed along a straight line which is at an angle α from the vertical line passing through the center O of the drum 5. To achieve the optimum focussing condition, the original receptacle 1 must also be disposed at an angle of α with respect to the horizontal (see FIG. 2). The optimum focussing condition cannot be satisfied if the receptacle 1 is left in its horizontal disposition.

To avoid the restriction imposed upon the arrangement as mentioned above, it is known to interpose a reflecting surface such as a mirror or a prism in the optical path of the array, thereby deflecting the optical path. By way of example, Japanese Laid-Open Patent Application No. 92,740/1975 discloses an arrangement as shown in FIG. 3 in which a single reflecting mirror 6 is interposed between the array 4 and the drum 5 to fold the optical axis at right angles. This arrangement suffers from the disadvantages that an inversion of the image occurs as a result of the presence of the mirror 6 and that the addition of another optical element in the optical path makes the arrangement susceptible to the influence of a marring. In particular, with an electrophotographic copying machine which employs dry developer and in which the scattering of toner is likely to occur, the influence of marring cannot be neglected. The inversion of the image can be overcome by disposing a pair of reflecting mirrors 6a and 6b on the opposite sides of the array 4, as shown in FIG. 4. However, this arrangement presents other difficulties in that the arrangement is more susceptible to the influence of a marring and that the closeness between the original surface v and the image receiving surface z makes the disposition of an illumination unit difficult.

While it may be contemplated to use a flexible fiber lens array in order to overcome the described disadvantages and difficulties by one effort. However, such array is very difficult to manufacture and is very expensive, presenting a great difficulty in practical use.

SUMMARY OF THE INVENTION

It is an object of the invention to eliminate described disadvantages by providing an optical image projector capable of providing a freedom in the relative disposition among an array of focussing elements which projects an erect positive image of unity magnification, such as fiber lens array, the plane of an object to be projected and an image receiving surface, while minimizing a degradation in resolution.

In accordance with the invention, an array of focussing elements is disposed so that its optical axis intersects with the plane of an object and an image receiving surface at an equal angle. With this simple arrangement, the projection of an optical image is allowed without causing any degradation in the resolution or a flow of image if the plane of an object and the image receiving surface are non-parallel to each other. This brings forth an increased freedom in the design of the apparatus. No additional optical elements such as reflecting mirror or prism is required, thus avoiding any adverse influence of a marring of such elements while affording a space margin between the array, the plane of an object and the image receiving surface.

DESCRIPTION OF PREFERRED EMBODIMENT

Figure 5:
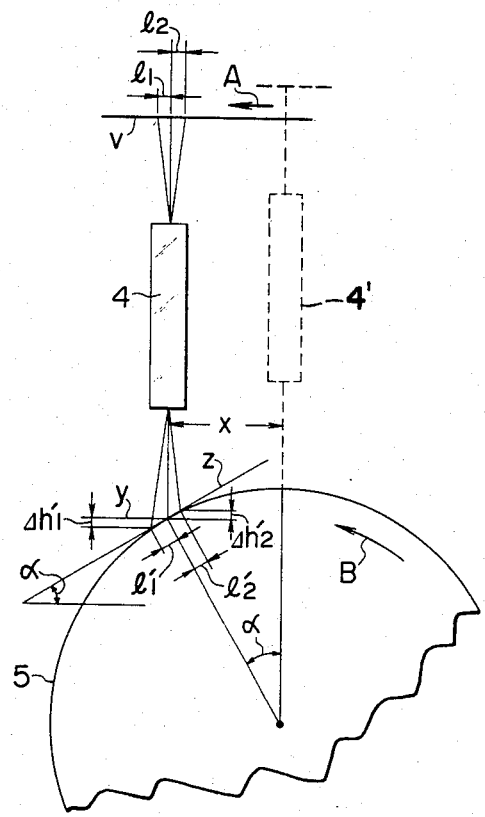
FIG. 5 is a view for illustrating the inconvenience caused in the optical image projector if the array is simply shifted.

Before describing the invention, a flow of image and a degradation in the resolution which would occur if the fiber lens array 4 is shifted horizontally with respect to the original surface v, which represents the plane of an object, will be described. FIG. 5 shows the fiber lens array 4 in its shifted position, and the phantom line position 4' represents the optimum position. In FIG. 5, $l_1$ and $l_2$ represents widths of a picture frame on the original receptacle or the original surface v which are projected by the fiber lens array 4. Similarly, $l_1'$ and $l_2'$ represent widths of a picture frame of the image of an object which is projected onto the image receiving surface z the drum 5. It will be understood that the image receiving surface z is defined by a plane which is tangential to the drum 5 at the point of intersection of the optical axis with the drum 5. In addition, $\Delta h_1'$ and $\Delta h_2'$ represent displacement from the focal plane y (image side focal plane) of the image receiving surface z at the ends of the respective widths. It will be readily apparent from FIG. 5 that $l_1' > l_1$, and as to $l_2'$, it may be equal to or different from $l_2$ depending on the shift x of the fiber lens array 4. In either instance, since $l_1' > l_1$, it follows that during the scan, as the original is moved at a uniform rate in a direction indicated by an arrow A on the original surface v and the drum 5 moves at the same speed in a direction indicated by an arrow B, the image of the original moves through a distance of $(l_1' + l_2')$ while the surface of the drum 5 moves only through a distance of $(l_1 + l_2)$, thereby producing a flow of image as the latter is recorded. Assuming that the image receiving surface z is inclined with respect to the horizontal surface by an angle $\alpha$, it follows that $(l_1' + l_2') \cos \alpha = l_1 + l_2$. Thus, a flow of image $\Delta l$ is given as follows:

$$\Delta l = (l_1' + l_2') - (l_1 + l_2) = (1 - \cos \alpha)(l_1' + l_2')$$

If it is assumed that $l_1' + l_2' = 5$ mm and the permissible flow $\Delta l$ of image is equal to 0.1 mm, it is concluded that $\alpha \approx 11.5°$. If the flow $\Delta l$ is permitted to twice the above mentioned value or 0.2 mm, the angle $\alpha$ is approximately on the order of 16°. Thus it will be seen that the magnitude of permissible shift x is limited to a small value. In other words, if the angle $\alpha$ is increased to allow an increase in the magnitude of the shift x, the flow of image $\alpha l$ will increase beyond a permissible limit.

Figure 6:
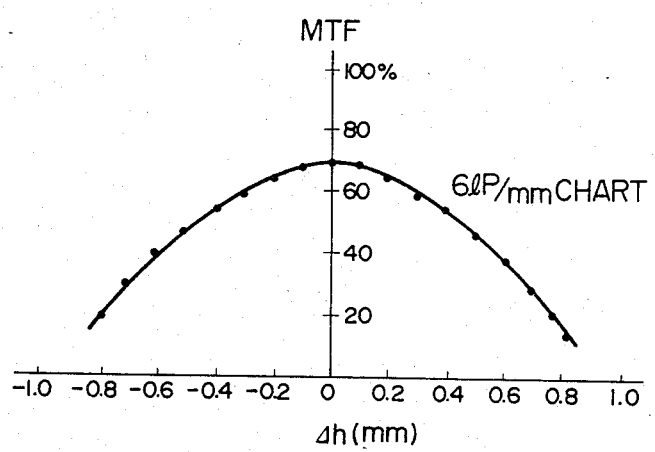
FIGS. 6 and 7 graphically and schematically illustrate a degradation in the resolution which would occur in the optical image projector of FIG. 5.
Figure 7:
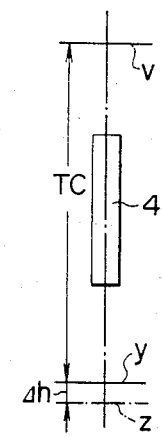

Furthermore, the arrangement shown in FIG. 5 suffers from a degradation in the resolution due to displacments $\Delta h_1' \Delta h_2'$ of the actual image receiving surface z at the opposite ends of the widths of the image field with respect to the image side focal plane y. FIGS. 6 and 7 graphically and diagrammatically illustrate an example of measurement of MTF (Modulation Transfer Function) which represents a degradation in the resolution when the original surface v is disposed on the object side focal plane and the image receiving surface z is displaced by a distance of $\Delta h$ from the image side focal plane y. The measurement has been made with respect to a fiber lens array 4 comprising a pair of stacked arrays of fiber lens, each having an angle of view of 6° and a diameter of 1.1 mm, with a distance Tc between the object side and the image side focal plane of 64 mm. A 6 lP/mm chart has an MTF value of about 70% on the focal plane y, but has a value which is reduced to one half the first mentioned value at a point which is spaced 0.6 mm from the focal plane. Assuming a width of image field $(l_1' + l_2') = 5$ mm, the relationship $\Delta h_1' \approx \Delta h_2' = \frac{1}{2}(l_1' + l_2') \sin \alpha$ permits the angle $\alpha$ at which the MTF value on the 6 lP/mm chart reduces to one-half value to be determined as 2.5 sin $\alpha = 0.6$ or $\alpha \approx 14°$.

Thus it will be seen that a degradation in the resolution will be substantial when the fiber lens array 4 is simply shifted to the lateral side as indicated in FIG. 5. In other words, the magnitude of shift x for the fiber lens array which can be permitted without degrading the resolution is limited to a very small value, affording very little freedom in the disposition.

Figure 1:
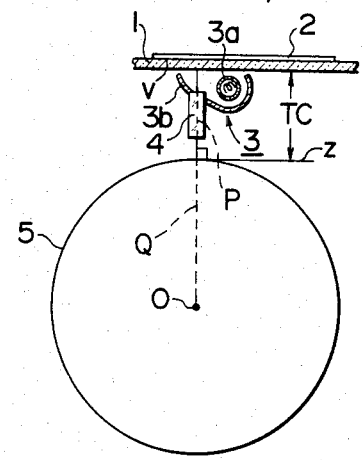
FIG. 1 is a schematic diagram illustrating an ideal disposition of an array of focussing elements as used in an optical image projector.
Figure 2:
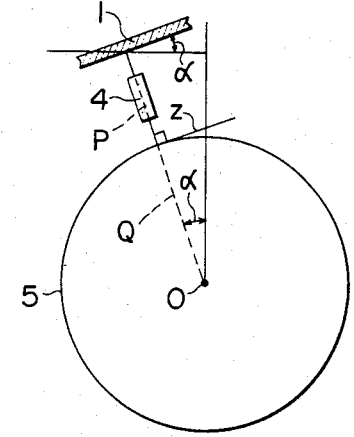
FIG. 2 is a schematic diagram illustrating the disposition of the plane of an object and the image receiving surface when the array of FIG. 1 is transposed to another location.
Figure 3:
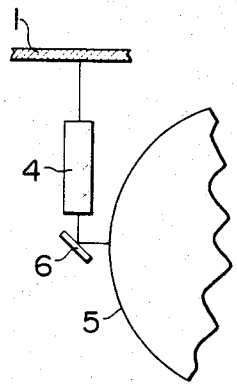
FIGS. 3 and 4 are fragmentary views of different conventional optical image projectors.
Figure 4:
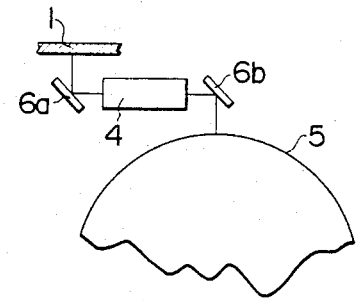

When the optical axis of the fiber lens array 4 is inclined through an angle of $\alpha$ in alignment with a straight line passing through the center O of the drum 5, in the same manner as illustrated in FIG. 2 (assuming that the original surface remains horizontal), a displacement between the object side focal plane and the original surface presents a difficulty. The optical relationship is analogous to the arrangement shown in FIG. 5, and the angle $\alpha$ of inclination which can be permitted can be derived by applying the analysis, mentioned above in connection with the image side and illustrated in FIG. 5, to the original image. It is again concluded that the latitude to shift the fiber lens array without degrading the resolution is very limited, affording little freedom in the design.

Figure 8:
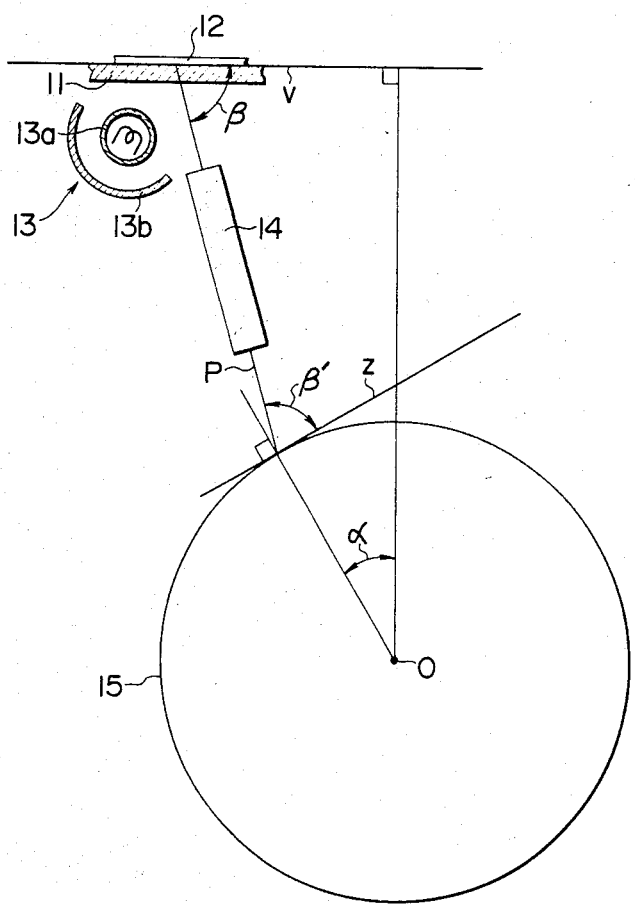
FIGS. 8 and 9 show the construction and the operation of an optical image projector according to one embodiment of the invention.

The invention provides an arrangement which overcomes the described difficulties and which is capable of significantly increasing the freedom in the design of the focussing optics while minimizing a degradation in the resolution, a change in the projection magnification and a flow of image. Specifically, FIG. 8 shows an optical image projector according to one embodiment of the invention. An original receptacle 11 is disposed on a horizontal plane, and an original 12 placed on an original surface (object plane) v is illuminated by an illumination unit 13 including a lamp 13a and a reflector 13b. Reflected light from the original is projected by a fiber lens array 14 onto a photosensitive drum 15 which represents an image receiving surface. It is to be understood that the image is projected onto a point on the drum 15 which is angularly displaced by an angle $\alpha$ from a vertical line passing through the center of the drum 15. For convenience of description, it is assumed that a plane z containing a tangential to the drum at a point of intersection between the optical axis P of the fiber lens array 14 and the drum 15 is regarded as an image receiving surface. In accordance with the invention, the original surface v, the image receiving surface z and the fiber lens array 14 are disposed in a manner such that the angle formed between the optical axis P of the fiber lens array 14 and the original surface v is equal to the angle formed between the optical axis and the image receiving surface z, and is located on the same side of the optical axis P as the latter angle. In other words, angles $\beta$ and $\beta'$, shown in FIG. 8 to the right of the optical axis P, are equal to each other. Such relationship can be easily attained since if the point of intersection between the optical axis P and the original surface v is given, the point of intersection between the optical axis P and the image receiving surface z can be determined, or conversely, if the point of intersection between the optical axis and the image receiving surface is given, the point of intersection between the optical axis and the original surface can be determined.

Figure 9:
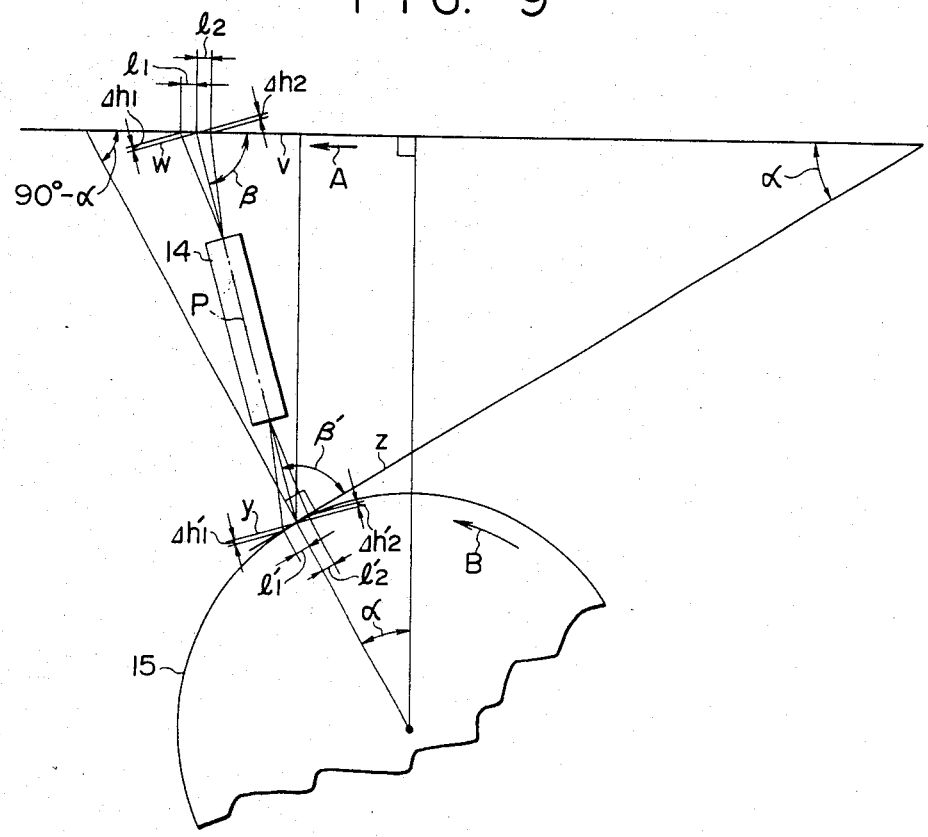

A flow of image and the resolution which would occur in the arrangement of FIG. 8 will now be considered in detail with reference to FIG. 9. It is to be understood that various characters used in FIG. 5 are also used in FIG. 9. Character w in FIG. 9 represents the original side focal plane. In accordance with the invention, the original surface v and the image receiving surface z intersect with the original side focal plane w and the image side focal plane y, respectively, on the optical axis P. Since both the original surface v and the image receiving surface z intersect with the optical axis P of the fiber lens array 14 with an equal angle $\beta=\beta'$ and since the fiber lens array projects an erect positive image, it follows that $l_1=l_1'$ and $l_2=l_2'$ even though $l_1 \neq l_2$ and $l_1' \neq l_2'$. Thus, $l_1+l_2 \equiv l_1'+l_2'$, meaning that an image of unity magnification is formed everywhere. Consequently, it will be seen that a flow of image does not occur when the original 12 and the drum 15 are scanned by moving them in directions indicated by arrows A and B, respectively, at the same speed.

Figure 10:
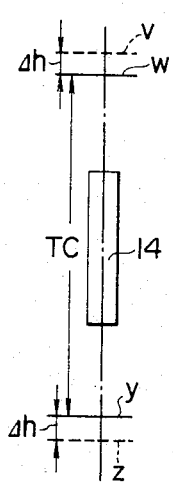
FIGS. 10 and 11 schematically and graphically illustrate the resolution achieved with the optical image projector of the invention.
Figure 11:
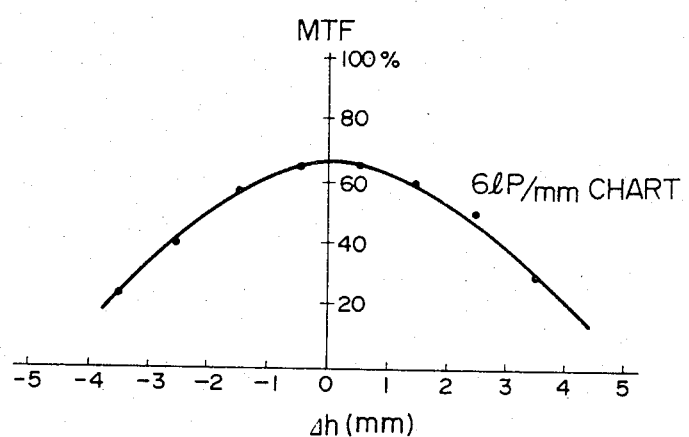

A degradation in the resolution will now be analyzed which is attributable to the fact that the original surface v is spaced from the original side focal plane w by $\Delta h_1$ and $\Delta h_2$, respectively, and the image receiving surface z is spaced from the image side focal plane y by $\Delta h_1'$ and $\Delta h_2'$, respectively. It will be understood from FIG. 9 that $\Delta h_1 = \Delta h_1'$ and $\Delta h_2 = \Delta h_2'$. Thus, the fiber lens array 14 is always located at the mid-point between the original surface v and the image receiving surface z. FIG. 10 illustrates that the original surface v and the image receiving surface z are spaced by $\Delta h$ from the original side focal plane w and the image side focal plane y, respectively. In a manner corresponding to FIG. 6, FIG. 11 graphically shows a measurement of 6 lP/mm chart, with MTF on the ordinate and $\Delta h$ on the abscissa. It is to be understood that the fiber lens array 14 is constructed in the same manner as used in the measurement of FIG. 7. FIG. 11 shows that MTF has a value of about 68% for $\Delta h = 0$, and reduces to 60% for $\Delta h = 1.5$ mm. It will also be seen that the value of $\Delta h$ for which the magnitude of MTF will be reduced to one-half of 68% or 34% is equal to about 3.2 mm. From FIG. 9, it is seen that $\Delta h_1' = \Delta h_1 = l_1 \sin \alpha/2$ and $l_1 \approx l_2$. Hence, if we choose that $(l_1+l_2)=5$ mm, $\Delta h$ will be equal to 1.5 mm if the value of MTF down to 60% is permitted. Accordingly, $1.5 = 5/2 \sin \alpha/2$ or $\alpha = 74°$. This means that an angle $\alpha$ less than 74° will produce a value of MTF which is closer to 68%. Thus it will be seen that the arrangement of the invention shown in FIG. 9 assures a projection magnification which is maintained unity without producing any flow of image, while allowing a greater displacement of the fiber lens array 14 with a reduction in the value of MTF, attributable to the misalignment between the original side and the image side focal plane w and y and the original surface v and the image receiving surface z, respectively, which is maintained very low.

In the embodiment described above, the fiber lens array is used as focussing elements which are used to project an erect positive image of unity magnification, but it should be understood that the invention is not limited to the use of such array, but that an optical image projector comprising a plurality of projection systems, each of which is formed by a spherical lens to project an erect positive image of unity magnification, can be used as well. While in the embodiment described above, the optical image projector of the invention has been illustrated as applied to an electrophotographic copying machine, it should be understood that the projector is also applicable to other arrangements where a non-parallel relationship prevails between an object plane and an image receiving surface.

What is claimed is:

1. An optical image projector including an array of optical focusing elements which projects an erect positive image of unity magnification of an object onto an image receiving surface which is not parallel to a first plane in which the object is obtained;
   characterized in that the array, the first plane of the object and an image receiving surface are disposed in a manner such that an angle formed between the optical axis of the array and the plane of the object is substantially equal to an angle formed between the optical axis and the image receiving surface, and is located on the same side of the optical axis as the latter angle.

2. An optical image projector according to claim 1 in which the array comprises an array of converging light transmitting members.

3. An optical image projector according to claim 1 in which the plane of object is defined by an original surface used in an electrophotographic copying machine and the image receiving surface is defined by the surface of a photosensitive drum.

4. An optical image projector according to claim 1, in which the array comprises a fiber lens array.

5. An optical image projector according to claim 1, comprising a projection system comprised of spherical lens elements for creating a positive image of unity magnification in said image receiving surface.

6. An optical image projector according to claim 1, in which the image receiving surface comprises a drum.

7. An optical image projector according to claim 6, in which said angle is measured between said optical axis and an imaginary line, which is tangential to the surface of said drum at the point where said optical axis intersects the surface of said drum.

8. An optical image projector according to claim 7, in which said drum is a photosensitive drum for performing electrophotographic copying.

* * * * *

UNITED STATES PATENT AND TRADEMARK OFFICE
CERTIFICATE OF CORRECTION

PATENT NO. : 4,533,228

DATED : August 6, 1985

INVENTOR(S) : Masaji Nishikawa

It is certified that error appears in the above-identified patent and that said Letters Patent is hereby corrected as shown below:

Column 1, line 16, after "of" insert --a--.

Column 3, line 49, change "$\alpha \ell$" to --$\Delta \ell$--.

Signed and Sealed this

Twenty-fifth Day of February 1986

[SEAL]

Attest:

DONALD J. QUIGG

Attesting Officer

Commissioner of Patents and Trademarks